E. W. VEST.
LATCHING DEVICE.
APPLICATION FILED FEB. 4, 1913.

1,136,065.

Patented Apr. 20, 1915.
3 SHEETS—SHEET 1.

Witnesses
James E. Sproll.
Clara A. Harm.

Inventor
Eugene W. Vest
By Adams & Brooks
Attorneys

E. W. VEST.
LATCHING DEVICE.
APPLICATION FILED FEB. 4, 1913.
1,136,065.
Patented Apr. 20, 1915.
3 SHEETS—SHEET 2.
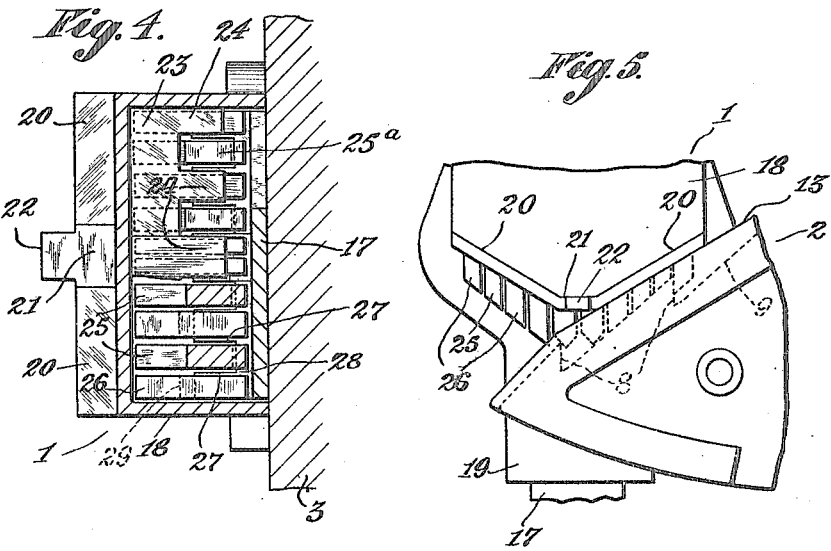
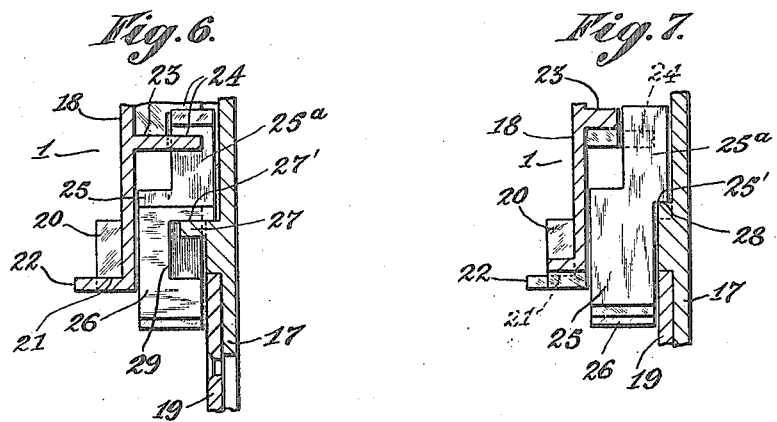
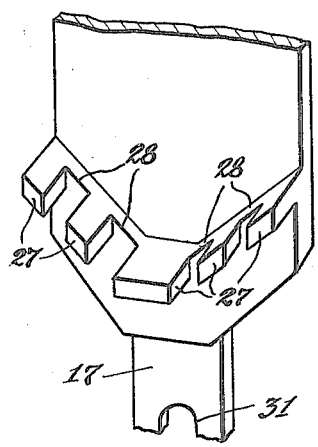
Witnesses
James E. Sproll.
Clara A. Harn.
Inventor
Eugene W. Vest.
By Adams & Brooks
Attorneys.

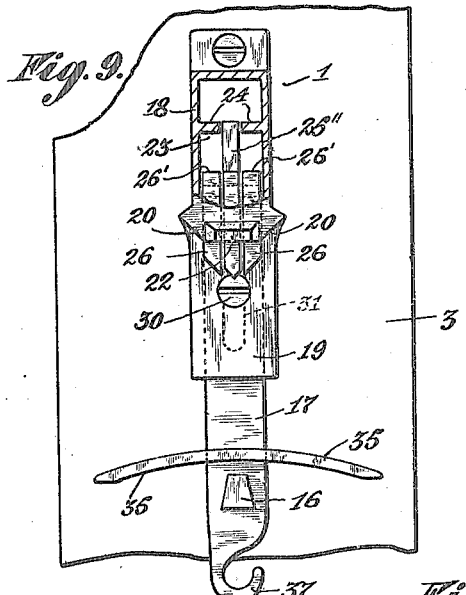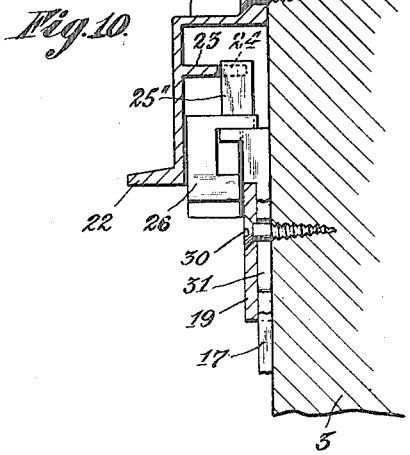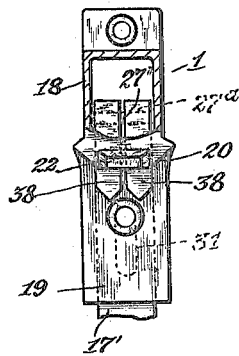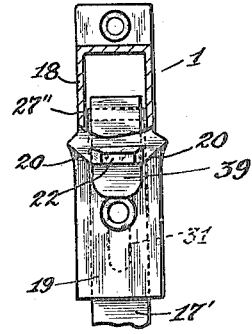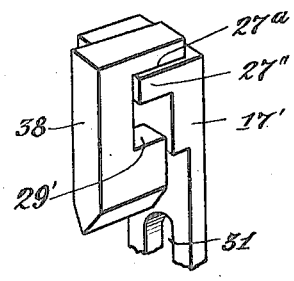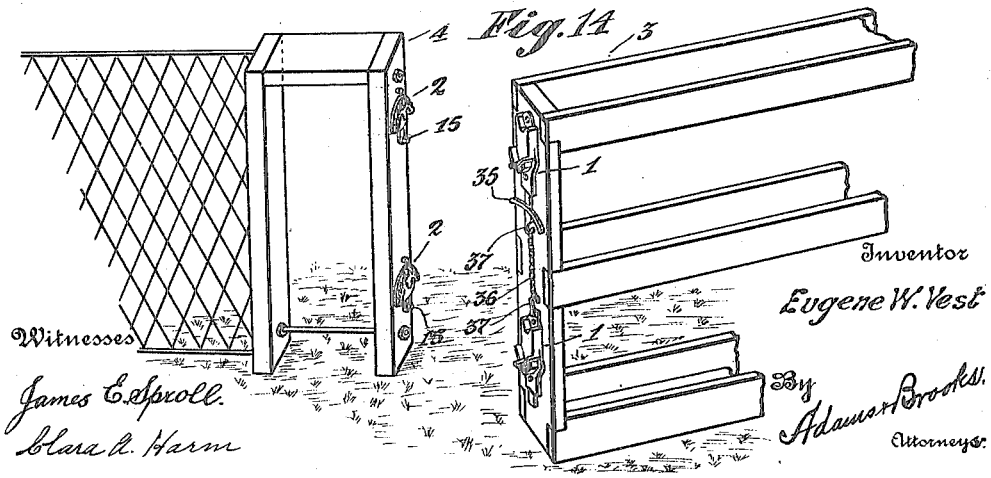

UNITED STATES PATENT OFFICE.

EUGENE W. VEST, OF TACOMA, WASHINGTON.

LATCHING DEVICE.

1,136,065. Specification of Letters Patent. Patented Apr. 20, 1915.

Application filed February 4, 1913. Serial No. 746,193.

*To all whom it may concern:*

Be it known that I, EUGENE W. VEST, a citizen of the United States of America, and a resident of the city of Tacoma, in the county of Pierce and State of Washington, have invented certain new and useful Improvements in Latching Devices, of which the following is a specification.

My invention has reference to latching devices and has for a primary object the provision of a construction which is efficient in operation, insuring of the gate or the like being latched in a more perfect manner.

In the forms shown, my invention is adapted for use in connection with swinging gates which are capable of being opened in both directions.

It is therefore a further object of my invention to provide a latching device which will operate with equal efficiency when the gate is swung in either direction to its closed position.

Other objects reside in the provision of novel guiding and stop means combined with the keeper and latch parts of the device.

In the accompanying drawings I have shown my invention in different forms, which are susceptible of various changes in the details of construction. The structural features, parts and combinations of parts on which I desire protection are therefore succinctly defined in my annexed claims.

Figure 1:
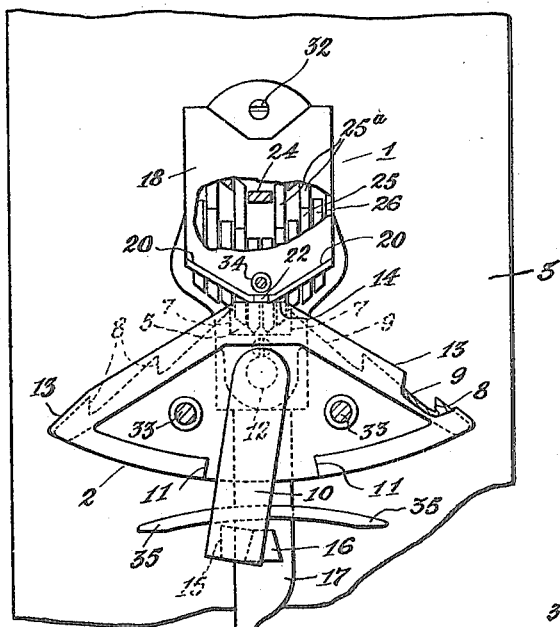
Figure 2:
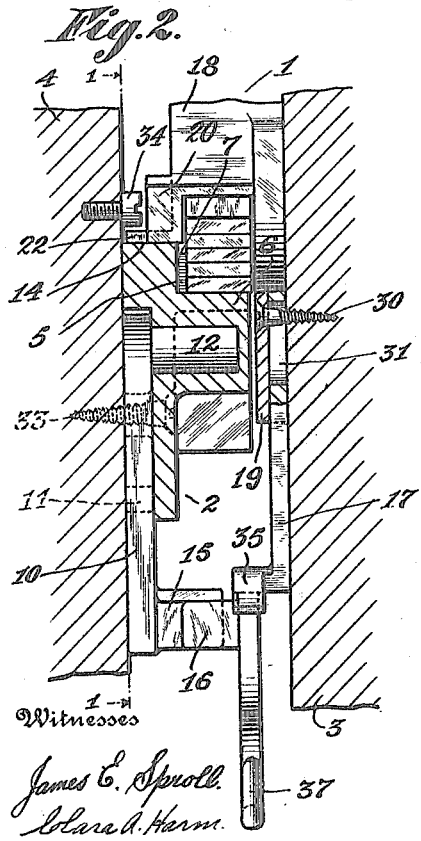
Figure 15:
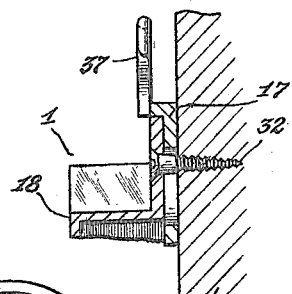
Figure 3:
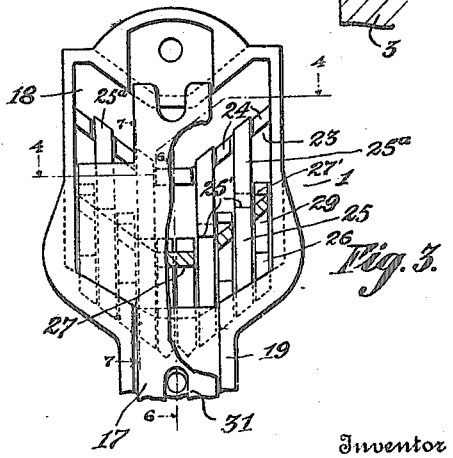

Figure 1 is a vertical section taken on line 1—1 of Fig. 2, portions being broken away. Fig. 2 is a fragmentary view of the latch and keeper parts engaged, the keeper part and a portion of the latch housing being in section. Fig. 3 is a fragmentary rear elevation of the latch part with a portion of the latch retractor broken away. Fig. 4 is a horizontal section taken on line 4—4 of Fig. 3. Fig. 5 is a fragmentary elevation illustrating the latch part engaged with the side stops of the keeper. Fig. 6 is a fragmentary vertical section taken on line 6—6 of Fig. 3. Fig. 7 is a fragmentary vertical section taken on line 7—7 of Fig. 3. Fig. 8 is a fragmentary perspective of the latch retractor. Fig. 9 is an elevation of a latch part of modified construction, a portion of the housing being broken away. Fig. 10 is a vertical section of the construction shown in Fig. 9. Fig. 11 is a fragmentary elevation with a portion broken away illustrating a further modification in the latch part construction. Fig. 12 is a similar view showing a further structural modification. Fig. 13 is a perspective of the retractor and one of the latches embodied in one of the modifications. Fig. 14 is a perspective showing my invention as in use in connection with a gate and a relatively fixed post of a fence, and Fig. 15 is a fragmentary vertical section of the lower latch part disclosed in Fig. 14.

In carrying out my invention I provide coöperating parts 1 and 2, conveniently termed "latch" and "keeper" parts respectively, one of which is normally carried by a movable element, as for example, a gate 3, to be thereby bodily moved to and from the other, which as shown, is mounted on a post 4 of a fence. Keeper part 2 comprises a rigid body having its rear upper edge portion shaped to provide oppositely inclined guides 13, 13 leading upwardly to a neutral centrally disposed rest portion 14 lying directly to the rear of and in line with a seat 5 formed in an outwardly projecting flange 6 of the body and bounded on its sides by stops 7.

Reference numeral 8 indicates spaced side stops provided on flange 6, these extending upwardly toward stops 7 in stepped relation and like said stops 7 being provided with upwardly inclined approaching surfaces 9. Beneath flange 6, the rear face of the keeper body is cut out for reception of an arm 10, which latter projects downwardly from the keeper between shoulders 11 thereof and is provided on its upper end portion with a stud 12, journaled in flange 6, see Figs. 1 and 2. Arm 10 is provided on its lower end portion with an outwardly projecting lug or stop 15 for engagement with a similar stop lug 16 of a retractor 17 of latch part 1, as will hereinafter be more fully set forth. Latch part 1 comprises a housing consisting of an outwardly projecting hollow body portion 18, open at its rear and lower portions, and a depending extension 19, the latter of which is formed in its rear face with a guide way for free reception of retractor 17.

Reference numeral 20 indicates oppositely inclined guides, consisting of flange extensions of the lower edge portion of the forward wall of housing body portion 18 and leading to a relatively centrally disposed bearing portion or surface 21 from which projects a lug 22. Within housing body portion 18 is a transverse partition 23 formed with spaced projecting guides 24 between which the shanks 25ª of latches 25 are slidably engaged.

Reference numeral 26 indicates relatively short latches, these occurring between the latches 25 so as to alternate therewith. The outermost latches must be restrained against lateral movement from the inner ones and, for this purpose, the said latches, being shown as short ones, are arranged to have direct bearing on the adjacent vertical side faces of housing body 18. The arrangement of long and short latches 25 and 26 described, enables me to provide a comparatively simple and compact structure, inasmuch as the latches 25 being directly engaged by guides 24 and abutting latches 26, serve to guide the latter in their movement. Latches 25 are further guided against lateral movement in a manner now to be described. The upper portion of retractor 17 is enlarged, to have free sliding engagement in housing body 18 and hence vertically forms a back wall between which and the front wall of the housing, the latches 25 and 26 are quite snugly received. This enlarged portion of retractor 17 is provided with alternating long and short shoulders 27 and 28 respectively, the former of which project into cut-outs 29 of latches 26 and have their upper faces normally engaged by the shoulders 27' provided by such cut-outs, see Fig. 6. Latches 25 are slidably received between the shoulders 27 and provided on their rear sides at the juncture of their shanks 25ª with shoulders 25' overlying and normally resting on shoulders 28, see Fig. 7. As now considered, all of the latches are free of one another and retractor 17 for limited vertical movement, and will lower by gravity in which position they will be held by the retractor with their active or lower end portions, which are preferably beveled, as shown, projecting so that progressing inwardly from either side toward the two centrally disposed latches, each succeeding latch will project slightly beyond the preceding one. They are therefore positioned for a more perfect riding engagement with the approach surfaces 9 of stops 7 and 8, as clearly shown in Fig. 5. In this connection it will be observed that through the provision of side stops 8, the gate can be securely held, though not fully closed. Retractor 17 is conveniently limited in its vertical movement by a screw 30 passing through keeper extension 19 and a slot 31 of the retractor. Latch part 1 is secured to the gate by screws 30, and 32 while keeper part 2 is secured to post 4 by screws 33.

Briefly stated, the operation of the parts described, is as follows: During closing movement of gate 3 one of the guides 20 engages a guide 13 and lifts the gate. The centrally disposed latches and those on one side thereof will therefore ride freely over those of the approaching surfaces 9 in their path, and upon encountering the adjacent stops 8 lower into interlocking engagement therewith and thereby prevent opening movement of the gate even though it be not fully closed. When however, the gate is fully closed, the latch part 1 will be in the position shown in Fig. 1, wherein the four central latches are desirably engaged in seat 5 between the shoulders 7. In this position bearing member 21 of the latch part 1 rests on the neutral or resting surface portion 14 of keeper part 2 and lug 22 lies under a stop 34, conveniently having a shank threaded into post 4, to prevent lifting of the gate.

The release of the engaged latches is effected by elevating retractor 17, and in this connection it will be observed that I preferably provide the retractor with oppositely projecting handles or fixed extensions 35 in convenient reach from either side of the gate.

In some instances I find it desirable to employ two of my latching devices in conjunction with a single gate and post, as shown in Fig. 14. Such devices are arranged one above the other, and the retractors 17 of the respective latch parts connected for simultaneous releasing operation by a flexible connection 36 engaged with hooked extensions 37 of the retractors.

In the construction shown in Figs. 9 and 10 I employ but three latches, short side latches 26' and a long intermediate latch 25", corresponding in construction and mode of operation to the latches 26 and 25 of the first described form of my invention.

In the modification disclosed in Figs. 11 and 13 the slidably mounted retractor 17' is provided with a continuous shoulder 27" fitting in cut-outs 29' of a pair of latches 38 for engagement with the shoulders 27ª thereof.

Instead of a pair of latches 38, a single latch 39 corresponding thereto in general form, though preferably of greater width, can be employed, as shown in Fig. 12.

Having thus described my invention, what I claim as new, and desire to secure by Letters Patent of the United States of America, is:—

1. A latching device comprising a latch, a housing in which said latch is mounted for vertical sliding, a vertically movable actuator slidably mounted in said housing and freely engaged with said latch, whereby said latch can be lifted independently of said actuator, and a keeper provided with a series of stops arranged for successive engagement with said latch.

2. A latching device comprising coöperating parts, one consisting of a latch and a bearing member, the other consisting of a keeper provided with reversely inclined guides for the bearing member of said first named part and with series of stops for said latch, the said series of stops of said last named part each being arranged adjacent one of the guides thereof and extending in stepped relation in the direction of its inclination.

3. A latching device comprising coöperating parts, one consisting of a latch and a bearing member, the other consisting of a keeper and inclined guides, said keeper having side stops and an intermediate seat for engagement with the latch of said first named part, the guides of said last named part being inclined upwardly to the seat of the keeper and adapted for engagement with the bearing member of said first named part.

4. A latching device consisting of coöperating parts, one comprising a bearing member and a relatively vertically movable latch, the other part comprising upper and lower stops having upwardly inclined approaching surfaces for riding engagement of the latch of said first named part, and guides for engagement by the bearing member of said first named part inclined upwardly to the upper stops of said last named part.

5. In combination with a latching device comprising a keeper part and a latch part adapted for locking engagement with said keeper part, one of which parts is adapted to be carried by the gate and the other by a post, a pivoted mounted stop, and an engaging member associated with said stop for swinging the same during movement of the gate and limiting movement of the latter to insure proper engagement of the latch part with said keeper part.

6. In combination with a gate and post, a keeper on one of said parts and a latch on the other, a swinging stop, a slidable stop arranged to engage said first named stop and thereby limit swinging of the gate to insure of the latch properly engaging said keeper, one of said stops being mounted on said gate and the other on said post, and means for sliding said last named stop for releasing it from said first named stop.

7. In combination with a gate and post, a keeper on one of said parts and a latch on the other, coöperating stops for arresting movement of said gate one of which stops is movable relatively to the other, means for securing one of said stops to said gate and the other to said post, and means for shifting said movable stop to disengage it from the other.

8. In combination with a gate and post, a keeper on one of said parts and a latch on the other, coöperating stops for arresting movement of said gate one of which stops is movable relatively to the other, means for securing one of said stops to said gate and the other to said post, and means for shifting said movable stop to disengage it from the other and simultaneously releasing said latch from said keeper.

9. In combination with a gate and post, a keeper on one of said parts and a movably mounted latch on the other, a slide for operating said latch to a releasing position, a stop on said slide, and a second stop for engagement with said first named stop to thereby arrest movement of said gate when said latch is in position to enter said keeper.

10. In combination with a gate and post, a keeper on one of said parts and a movably mounted latch on the other, a slide for operating said latch to a releasing position, a stop on said slide, and a second stop for engagement with said first named stop to thereby arrest movement of said gate when said latch is in position to enter said keeper, said second stop being swingingly supported, whereby it will coact with said first named stop when the gate is swung in either direction.

11. In a latching device, a gate, a latch, a housing on said gate slidably supporting said latch, a vertically slidable actuator for said latch having a play connection therewith, a stop on said actuator, in combination with a second stop and a keeper, both mounted on a relatively fixed part at the side of the path of said gate for engagement by said first named stop and latch respectively.

12. In combination with gate and post elements, a keeper on one of said elements provided with a seat and side guides inclined downwardly therefrom, a fixed stop overlying the seat of said keeper, a housing on the other of said elements provided with inclined parts for sliding engagement with the guides of said keeper, a latch in said housing for engagement with said keeper, and a fixed lug on said last named element arranged to project under said stop when said latch is engaged in said keeper, to thereby prevent lifting of the gate.

13. In a latching device, a housing, a guide in said housing formed with an opening, a latch retracting device provided with shoulders one projecting from the other, two latches each having a shoulder arranged for engagement with a respective one of the shoulders of said device, one of said latches having an extension projecting through and slidably engaged in the opening of said guide.

14. In a latching device, a housing, a transverse series of spaced guides in said housing, a latch retracting device in said housing provided with a transverse series of alternating short and long shoulders the former of which occur opposite the spaces between said guides, and alternating long and short latches having shoulders for engagement with the adjacent shoulders of said device, the said short latches fitting over the long shoulders of said device and the said long latches lying between said short latches and said guides.

15. In a latching device, a housing, a plurality of independently vertically movable latches mounted in and projecting from said housing, succeeding latches projecting slightly beyond those on one side thereof, and means for elevating said latches simultaneously.

16. In a latching device, a housing having a raised portion formed in its lower side with an opening, a series of independently vertically movable latches mounted in the raised portion of said housing and projecting through the opening thereof, the inner of said latches projecting beyond the adjacent outwardly disposed latches, and a vertically movable means for elevating said latches simultaneously.

17. In combination with a gate and a post, keeper parts arranged on said post one above the other, latch parts for engagement with said keeper parts mounted on said gate, said latch parts having vertically movable latches, retractors for the latches of said latch parts, and a flexible connection between said retractors, for the purpose specified.

Signed at Seattle, Washington, this 27th day of December, 1912.

EUGENE W. VEST.

Witnesses:
E. ARLITA ADAMS,
CLARA A. HARM.

Copies of this patent may be obtained for five cents each, by addressing the "Commissioner of Patents, Washington, D. C."